N. JOLEEN.
CONTROLLING APPARATUS.
APPLICATION FILED JUNE 30, 1911.
1,117,394.
Patented Nov. 17, 1914.
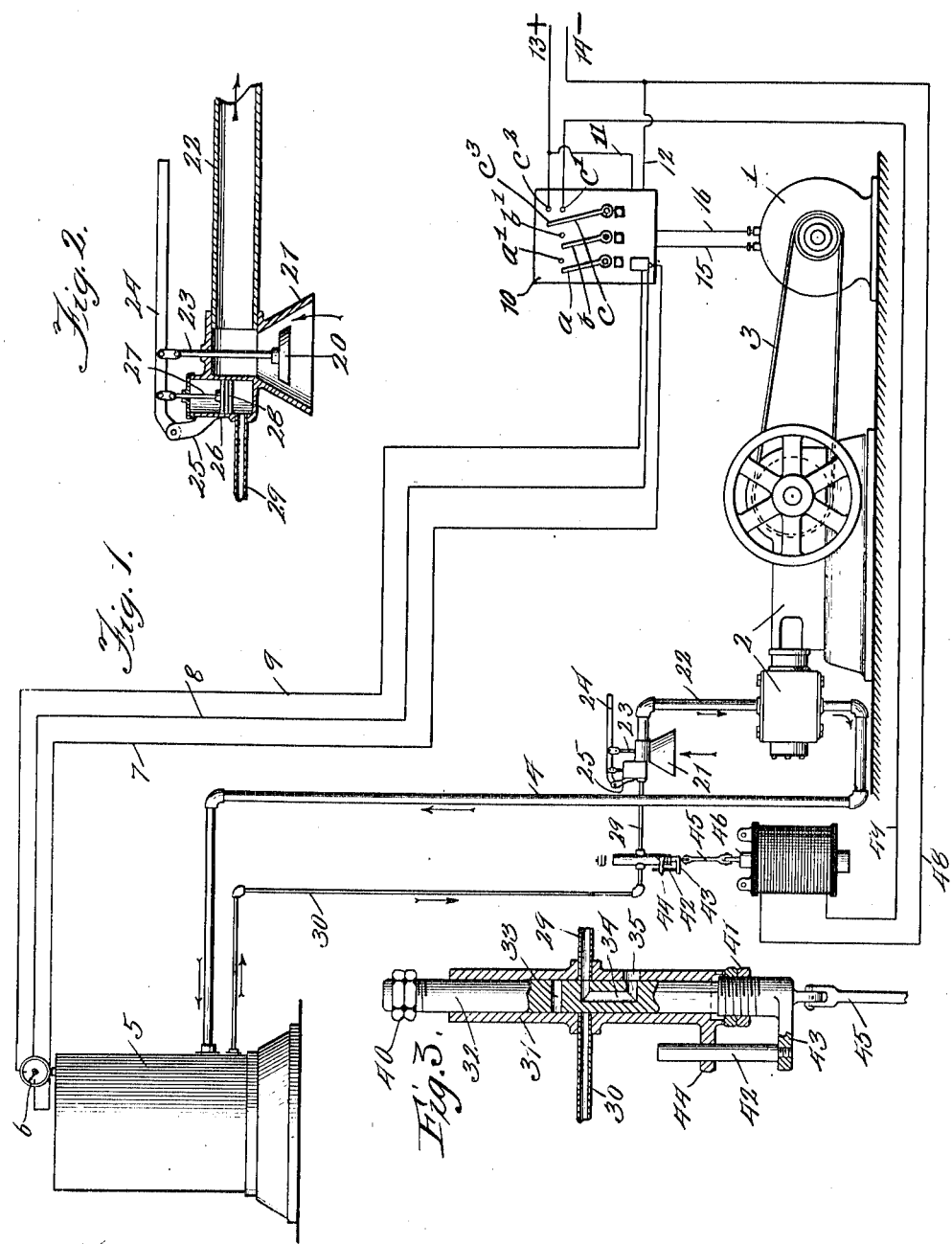

UNITED STATES PATENT OFFICE.

NELS JOLEEN, OF CHICAGO, ILLINOIS.

CONTROLLING APPARATUS.

1,117,394.      Specification of Letters Patent.      Patented Nov. 17, 1914.

Application filed June 30, 1911. Serial No. 636,147.

*To all whom it may concern:*

Be it known that I, NELS JOLEEN, a citizen of the United States, residing at Chicago, in the county of Cook and State of Illinois, have invented a certain new and useful Improvement in Controlling Apparatus, of which the following is a specification.

My invention relates to controlling apparatus, and is particularly adapted for controlling the operation of motor-driven air compressors of large size.

It is well known that air compressors are frequently used to supply air or other gases under pressure to storage tanks and that in such cases it is desirable that the pressure in the tanks be automatically maintained within certain prescribed limits, for example, ninety and a hundred pounds. In units of small size no great difficulty presents itself in providing apparatus which will automatically obtain the results desired, but in large units, for example, when the compressors are of one hundred and fifty horse power or larger it is a different matter. One of the means now in use for controlling these larger compressors is known as an " unloading device," which has an unloading valve which controls the supply of air to the compressor. The motors run continuously and by shutting said valve when the maximum pressure is reached, no more air can pass into the compressor and hence the compressor will run idle. This unloading valve has been operated by a piston working in a chamber which communicates with the interior of the storage tank. With this type of unloading device the motor and compressor run continuously and the said valve is controlled by a piston whose chamber is in direct communication with the interior of the storage tank. One of the disadvantages of the system thus employing the continuously operating motor and the said unloading device is due to the waste of electric energy in keeping the motor and compressor running continuously and the waste due to the unnecessary wear and tear upon the motor and compressor. In small plants, of course, the unloading valve may be easily operated, for example directly by an electromagnet, but in large plants the force required to operate it is so large that electromagnets for this purpose become impractical. Another system of compressor control is one in which the motor and compressor are stopped when the pressure reaches the prescribed maximum and are again started when the pressure reaches the prescribed minimum. The disadvantage in this system, however, is that the motor has to be of an unnecessarily large size in order to be able to start the compressor from rest against practically full load, that is, against the load which the compressor is under in forcing air into the tank against the pressure therein. This system has another disadvantage in that by turning on the current when the motor is standing still there is danger of burning out the motor or its connections. Furthermore, the great flow of current at the moment of starting increases the consumer's "maximum demand" or load peak, and hence under the ordinary systems of charging increases the customer's rate and consequently the amount of his bills.

The object of my invention is to provide simple, efficient, and positive acting apparatus for automatically controlling air compressors of large capacity and to render it practical to employ a motor of a size merely sufficient to operate the compressor under normal operating conditions and at the same time start and stop the motor when the pressure reaches the prescribed minimum and maximum respectively.

In my invention I utilize the compressed air in the tank for furnishing the power to operate the unloading device, and control this air by auxiliary apparatus. In the form here illustrated this auxiliary apparatus comprises an auxiliary valve operated by an electromagnet.

I accomplish my object by the mechanism illustrated in the accompanying drawings, in which—

Figure 1 is a diagrammatic view of apparatus embodying my invention. Fig. 2 is a longitudinal view of the unloading device, and Fig. 3 is a longitudinal section of the auxiliary or controlling valve.

Similar reference characters denote similar parts throughout the several views.

The electric motor 1 is connected to the compressor 2 by a belt 3 or other suitable means. A pipe 4 leads from the compressor to the tank 5, where the air or other gas is to be stored. Mounted upon the tank is a contact gage 6 to which are connected three electric conductors 7, 8 and 9. This gage is a well known standard piece of apparatus and is so constructed that when the pressure in the tank reaches a predetermined minimum it will energize one pair of said conductors 7, 8, 9, and when the pressure reaches the predetermined maximum will energize another pair of the said conductors. The gage is so constructed that the "lead;" that is, the range between the maximum and minimum at which it will come into operation may be varied, as desired.

The conductors 7, 8, 9 are suitably connected to an automatic starter 10 which is a well known standard piece of electric apparatus, and is provided with a number of arms $a$, $b$, $c$, adapted to engage respectively the contacts $a'$, $b'$, $c'$. To this automatic starter lead two supply conductors 11 and 12 which are connected to the main supply terminals 13 and 14 respectively. Leading from said automatic starter to the motor are two conductors 15 and 16 through which the electrical energy for starting the motor is supplied. It is sufficient for the present purpose to say that the automatic starter is so constructed that when the proper pair of the conductors 7, 8, 9 (which, for convenience, may be referred to as the "starting pair") is energized the arm $a$ will first move into engagement with its contact $a'$, then the arm $b$ will move into engagement with its contact $b'$, and finally the arm $c$ will move into engagement with its contact $c'$. The effect of this operation is to supply, first, a small amount of current to the motor and then gradually increase the amount by cutting out resistance until finally when the arm $c$ engages its contact, full current will be supplied to the motor. Conversely, when the remaining pair of the conductors 7, 8, 9 (which, for convenience, may be referred to as the "stopping pair") is energized by the contact gage 6 the arm $c$ will be moved out of engagement with its contact $c'$ and thus break the circuit to the motor. It will be noted that with this automatic starter the arm $c$ is the last to move into engagement with its contact and does not do so until the motor is running practically full speed. In my apparatus I utilize this last arm $c$ to operate the unloading device which will presently be described. As will hereinafter be explained, the unloading valve 20 of the unloading device remains closed and hence the air supply to the compressor is shut off and the compressor runs idle until this last-to-operate arm $c$ moves into engagement with its contact $c'$ and the motor is running at practically full speed.

The unloading device which is shown separately in Fig. 2, comprises the aforesaid unloading valve 20, which seats upon the inlet valve seat 21 connected to the supply pipe 22 which leads to the compressor 2. When said valve is open, air may flow to the compressor but when it is closed the flow is prevented and the compressor runs idle, having no load other than that due to atmospheric pressure. Said valve is operated by a stem 23 which is connected to an arm 24 fulcrumed upon the bracket 25 upon the stationary piston chamber 26. Said arm is connected to the piston rod 27 attached to the piston 28. A pipe 29 leads to the piston chamber and is supplied with air from the tank in the manner hereinafter explained. The construction of the parts is such that when the air is admitted to pipe 29 it forces the piston 28 upward and closes the valve 20. Conversely, when said pipe is "bled" the weight of the piston 28 and valve 20 will cause the latter to open.

I will now describe the controlling valve whereby the flow of air within pipe 29 is controlled.

A pipe 30 leads from the storage tank 5 to the casing 31 which contains the controlling valve 32. In the preferred form shown in Fig. 3 the pipes 29 and 30 enter the casing 31 from diametrically opposite points. A horizontal passage 33 is formed in the valve, with the result that when said valve is lowered in position to bring said passage into register with pipes 29 and 30 the air from the tank is permitted to flow directly to the piston chamber 26, and causes the air to raise piston 28 and close the valve 20. A second passage 34 is formed in the valve 32, said passage 34 being adapted when the valve is raised to communicate at one end with pipe 29 and at the other end with an opening 35 in the side of the casing. When the parts are in this position, illustrated in Fig. 3, the exit of air from pipe 30 will be prevented and the air within pipe 29 will be permitted to pass backward through the passage 34 and opening 35 out into the atmosphere. This will bleed the pipe 29 and piston chamber 26 and permit the valve 20 to open under the action of gravity. It will thus be seen that when the controlling valve 32 is lowered the unloading valve 20 will close and when said controlling valve is raised said unloading valve will open and will remain open until valve 32 is again lowered. Said valve projects through the casing at both ends and is screw threaded to receive the lock nuts 40 and 41 which are adapted to contact the ends of the valve casing and limit the movement of the valve. By adjusting these nuts upon the valve the registering areas of the passages 33 and 34 with the pipes 29 and 30 may be varied; to illustrate, it may be found that if, when the valve is lowered to such position as to bring the passage 33 completely in line with the pipes 29 and 30 the flow of air to the piston chamber 26 would be so rapid as to produce an unnecessary shock or jar in seating the valve 20 upon the valve seat 21. By lowering the lock nuts 40 on the valve, however, so that when such nuts contact the upper end of the valve casing and thus arrest the valve only a small portion of the passage 33 will be in communication with the pipes 29 and 30, the flow will be choked and thus cause the piston 28 and valve 20 to operate more slowly. In a similar manner, by adjusting the lock nuts 41 the rate of escape of the air from the pipe 29 may be regulated and thus prevent said piston and valve from dropping too rapidly. A guide rod 42 is fastened to a lug 43 formed upon the valve 32 and slides within a bracket 44 formed upon the casing 31. This prevents said valve from rotating and thus insures that the passages in the valve will register with the pipes 29 and 30 and aperture 35 when the valve is brought to the proper elevations.

In the preferred construction herewith illustrated valve 32 is normally down and the passage 33 is normally in register with the pipes 29 and 30. Under these conditions the unloading valve 20 will be closed. The advantage in this arrangement is that unless the valve 32 is being positively held up, air will be prevented from entering the compressor and hence the latter will run idle and there will be no danger of overloading the tank or in wasting energy in case the tank is provided with a safety valve.

Valve 32 is operated by a link 45 which is connected to the core 46 of an electromagnet 47. The arrangement is such that when said electromagnet is energized the valve will be raised and cause the unloading valve 20 to open. Said magnet is energized through the conductors 48 and 49, the conductor 48 being connected to one of the main contact terminals 14 and the conductor 49 being connected to the contact $c'$ on the automatic starter 10. The remaining main terminal 13 is connected to a contact $c^2$ upon the panel of the automatic starter 10. A conducting extension $c^3$ is formed upon the end of the arm $c$ in such manner that when said arm is in engagement with the contact $c'$ above mentioned, said extension $c^3$ will electrically connect said contact $c'$ with the contact $c^2$, and thus cause the electromagnet to be energized. It will thus be seen that said magnet is not energized until the arm $c$ of the automatic starter is moved into acting condition, at which time the motor will be running at full speed.

Operation: From the foregoing it will be apparent that in my apparatus when the pressure in the tank is at the prescribed maximum, the arms $a$, $b$, and $c$ of the automatic starter 10 will be in non-active position, as shown in the drawings, and the motor and compressor will be standing still. The magnet 47 will be deënergized and the controlling valve 32 will be in lowered position and the unloading valve 20 will be closed. The parts remain in these positions until the pressure in the tank drops to the prescribed minimum, whereupon the arm $a$ of the automatic starter will move into active position and admit a small amount of current to the motor to start it. The arm $b$ soon follows suit, causing an increased supply for the motor and bringing the latter substantially or fully up to speed. This gradual starting of the motor is possible by reason of the fact that the load is not yet imposed upon the compressor. The arm $c$ next moves to active position, thereby performing the double function of cutting out the series resistance from the motor and simultaneously closing the circuit through the electro-magnet 47 and thereby causing the unloading valve 20 to open and permit the compressor to force air into the tank. This condition continues until the pressure in the tank has again been brought to the prescribed maximum whereupon the arms $a$, $b$, and $c$ will be automatically thrown to non-active position, thus breaking the circuit both through the motor and through the electromagnet 47.

Having thus described my invention, what I claim as new and desire to secure by Letters Patent is:—

An air compressing and storing system comprising a tank for the compressed air, an air compressor delivering thereinto, said compressor having an inlet open to the atmosphere, an electric motor for driving said compressor, an inlet valve for closing and opening the inlet of said compressor, said valve having a constant tendency to open, air actuated means for closing said valve, a duct leading from said tank to said air actuated means for supplying compressed air thereto for operating it, a controlling valve in said duct, said controlling valve having a constant tendency to open to permit air to flow from the tank to said air actuated means for closing the inlet valve, said controlling valve being movable to closed position to prevent the flow of air in said duct away from the tank, said controlling valve having a bleed passage adapted, when the valve is in closed position, to permit the air to escape from the air actuated means associated with the inlet valve, whereby when said controlling valve is in closed position, the inlet valve is permitted to open, an electromagnet operating said controlling valve, an electric circuit for said magnet, said magnet when energized moving the controlling valve to closed position to bleed said air actuated means and permit the inlet valve to open, said magnet when deënergized permitting the controlling valve to move to open position, a motor circuit for supplying energy to the motor and a motor starter responsive to the pressure in the tank, said motor starter having a plurality of arms adapted to vary the resistance in the motor circuit for permitting the motor to gradually attain its speed, said arms operating successively in cutting out resistance from the motor circuit, one only of said arms, to-wit: the one which last operates in cutting out resistance, also serving to close the circuit through said magnet whereby the controlling valve moves not until the motor has attained full speed and then moves to open position.

In witness whereof, I have hereunto subscribed my name in the presence of two witnesses.

NELS JOLEEN.

Witnesses:
 HOWARD M. COX,
 MARGARET D. ROBB.